No. 694,692. Patented Mar. 4, 1902.
H. W. SUMNER.
POWER TRANSMITTING MECHANISM.
(Application filed Dec. 13, 1901.)
(No Model.) 3 Sheets—Sheet 1.
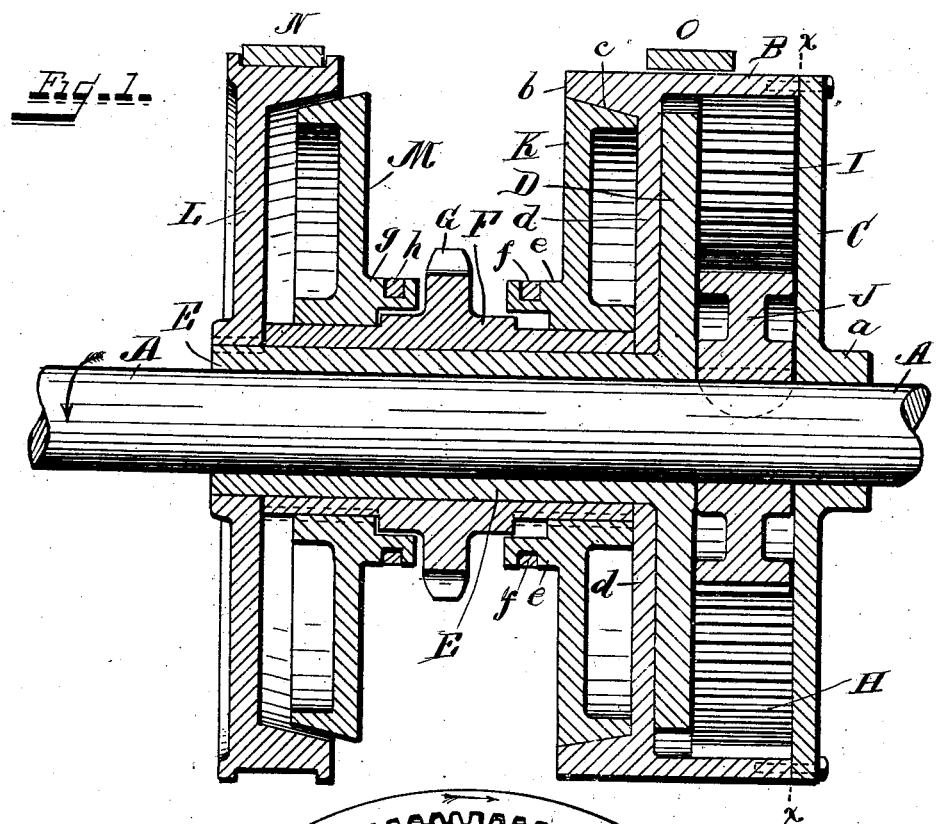
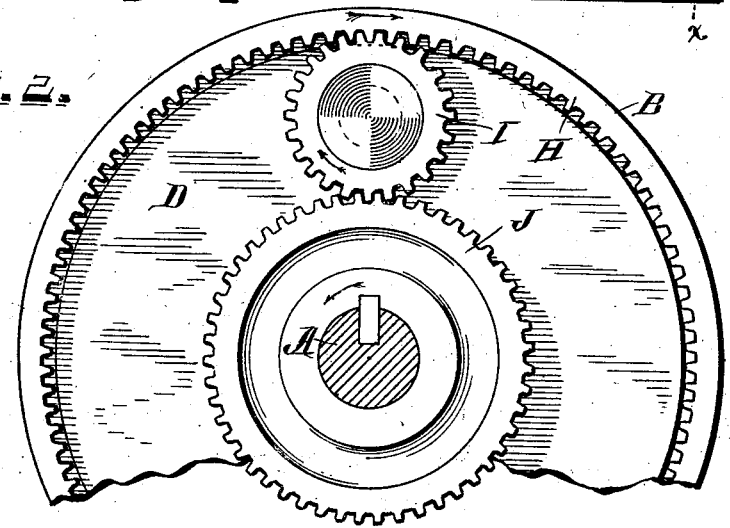
Witnesses.
Wm. J. Beck.
Edward Peck.
Inventor.
Harry W. Sumner
by Chas. ... Peck
his Attorney.

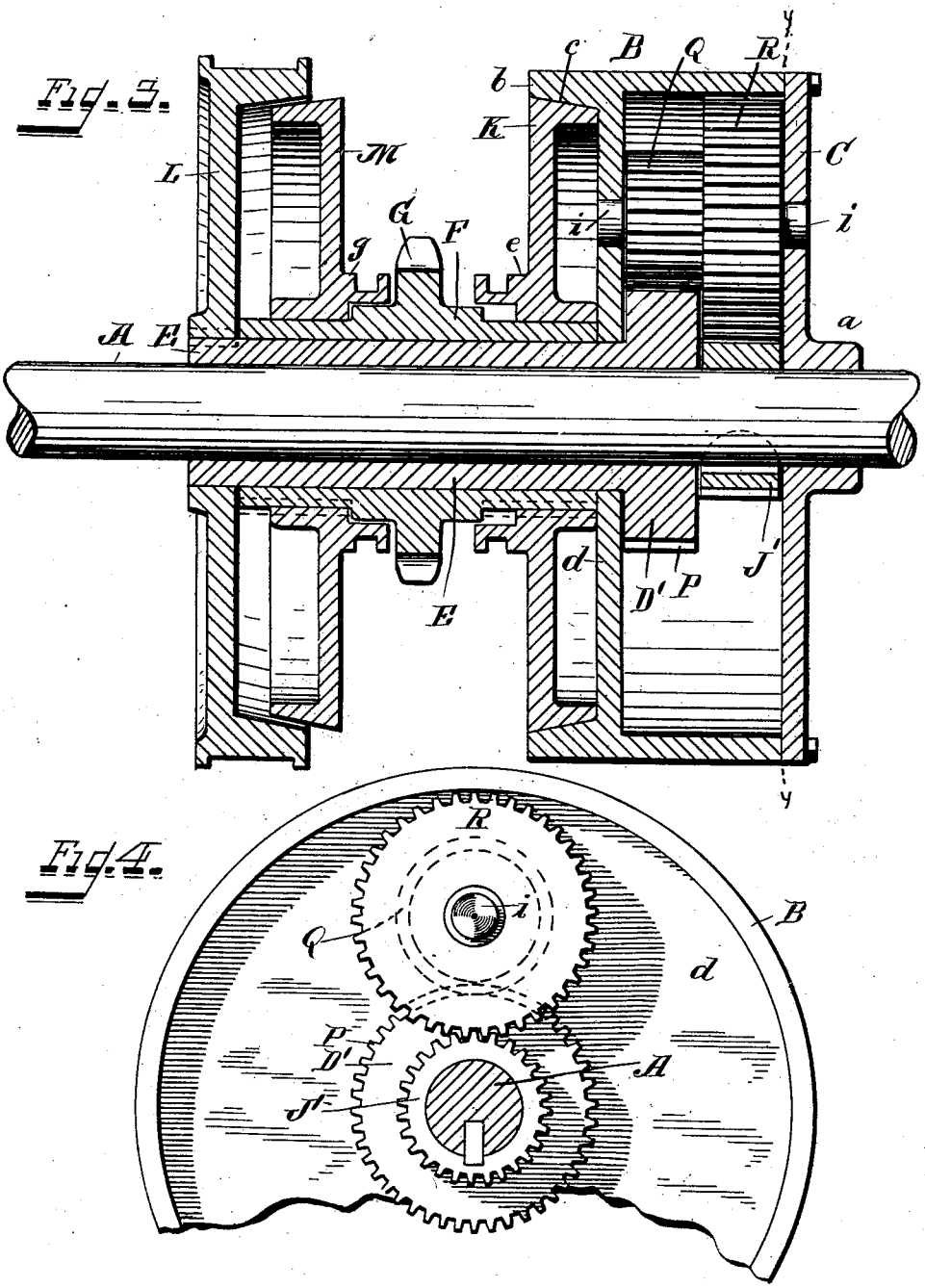

No. 694,692. Patented Mar. 4, 1902.
H. W. SUMNER.
POWER TRANSMITTING MECHANISM.
(Application filed Dec. 13, 1901.)
(No Model.) 3 Sheets—Sheet 3.

Witnesses. Inventor.
Harry W. Sumner
by Chas. Peck
his Attorney.

UNITED STATES PATENT OFFICE.

HARRY W. SUMNER, OF CINCINNATI, OHIO, ASSIGNOR TO THE LUNKENHEIMER COMPANY, OF CINCINNATI, OHIO, A CORPORATION OF OHIO.

POWER-TRANSMITTING MECHANISM.

SPECIFICATION forming part of Letters Patent No. 694,692, dated March 4, 1902.

Application filed December 13, 1901. Serial No. 85,830. (No model.)

*To all whom it may concern:*

Be it known that I, HARRY W. SUMNER, a citizen of the United States, residing at Cincinnati, in the county of Hamilton and State of Ohio, have invented certain new and useful Improvements in Transmitting Mechanism, of which the following is a full, clear, and exact description, reference being had to the accompanying drawings, forming part of this specification.

My invention relates to mechanism for transmitting power and speed from a driving to a driven shaft, and more particularly for use in the driving-gears of motor-vehicles; and it has for its object the improved construction of such transmitting mechanism whereby the speed can be increased or decreased and its direction of revolution changed at the will of the operator, the whole being accomplished by mechanism which is exceedingly simple in construction and efficient in action.

The novelty of my invention will be hereinafter more fully set forth, and specifically pointed out in the claims.

Figure 5:
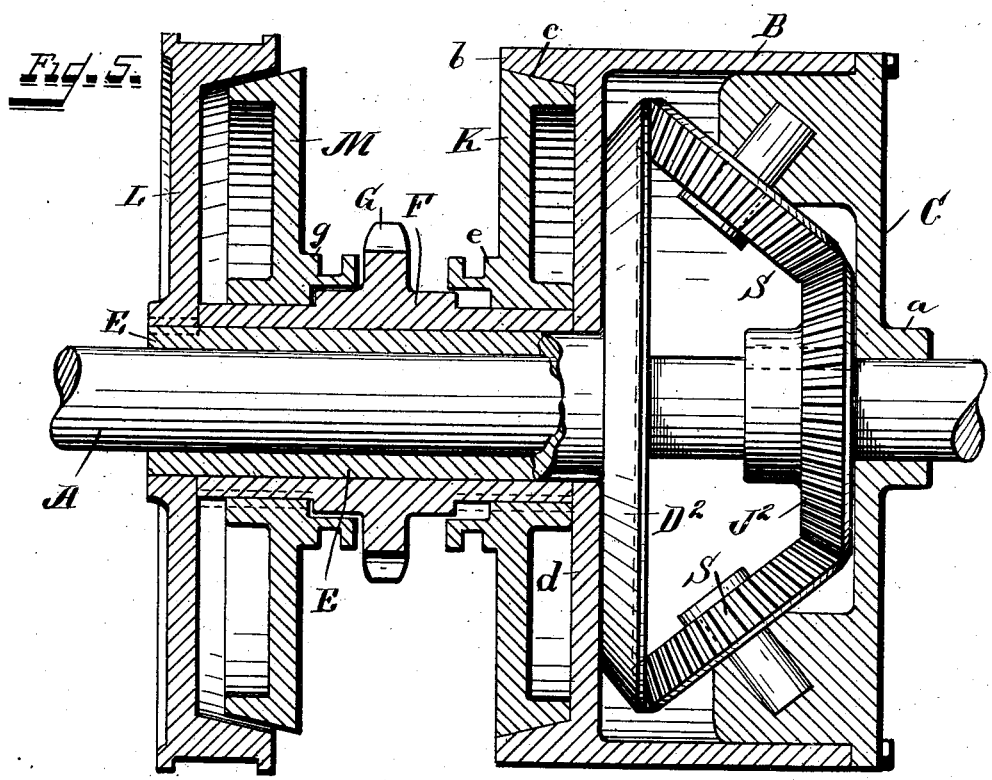
Figure 6:
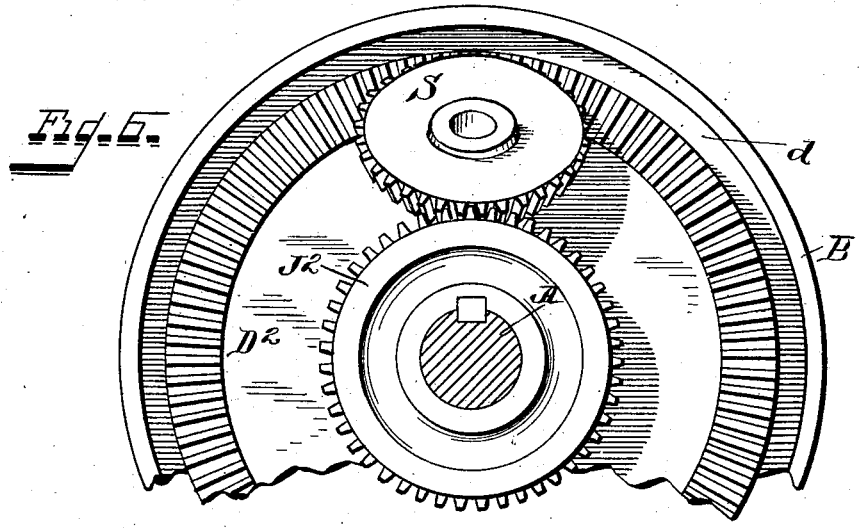

In the accompanying drawings, Figure 1, Sheet 1, is a sectional elevation on the axis of the driving mechanism. Fig. 2, Sheet 1, is a broken end elevation on the dotted line *x x* of Fig. 1 looking to the left. Fig. 3, Sheet 2, is a view corresponding to Fig. 1, but representing a modification in the construction. Fig. 4, Sheet 2, is a broken end elevation on the dotted line *y y* of Fig. 3 looking to the left. Fig. 5, Sheet 3, is a view corresponding to Figs. 1 and 3, but showing a still further modification in the construction. Fig. 6, Sheet 3, is a broken end elevation looking to the left of Fig. 5 with the end plate of the drum or casing removed.

The same letters of reference are used to indicate indentical parts in all the figures.

Referring now particularly to Figs. 1 and 2, A represents the driving-shaft—say, for instance, the crank-shaft of a gasolene-engine or other similar motor of an automobile and having a constant direction of revolution indicated by the arrows. Assuming Fig. 1 to be a view looking toward the rear of the vehicle and that the driven axle or shaft of the same is in the rear of the shaft A, there is mounted loosely upon said shaft upon the right a drum B, whose outer face is a removable head C, having a hub *a* bearing upon the axle, and whose inner face forms an exterior clutch member *b*, with an internal beveled periphery, as seen at *c*. Within the drum B and bearing against its inner head *d* is a disk D, having integral therewith or made fast upon a sleeve E, with its bearing upon the axle A and loose thereon, said sleeve passing through a perforation in the inner head *d* of the drum. Likewise loose upon the sleeve E and having its bearing upon the same is a sleeve F, having integral therewith or made fast thereon a sprocket-wheel G. The interior face of the drum B, between the disk D and head C, is an unbroken spur-gear H, forming an internal gear for the drum, and with this gear meshes a pinion I, carried by and pivoted upon the disk D. The pinion I meshes with a spur-gear J, keyed or otherwise fast upon the shaft A and located between the disk D and head C.

Feathered upon the sleeve F is the internal disk member of a clutch K, adapted to be engaged and be disengaged from the clutch-surface *c* of the drum B, after a well-known manner of friction-clutches, and to slide the clutch member K to effect its engagement and disengagement it is provided with a hub *e*, having a circumferential groove with which a fork-shifter *f* engages in the usual or any suitable manner.

On the left of the drum B is an external clutch-disk L, keyed or otherwise made fast upon the sleeve E, and, like the opposing internal clutch K, there is an internal clutch M feathered upon the sleeve F and adapted to be engaged with or disengaged from the clutch-disk L by means of a circumferentially-grooved hub *g* and any suitable shifter *h* engaging therewith.

Any suitable brake mechanism N, which may be a shoe-brake or band-brake and under control of the operator, is used in connection with the clutch-disk L to loose or lock the same, and similar brake mechanism O is used in connection with the drum B for the same purpose.

Assuming that the sprocket-wheel G is connected by a drive-chain with a similar sprocket-wheel upon the axle or shaft to be driven and assuming the brake N to be engaged with the disk L to lock the same, its clutch M being disengaged and the opposite clutch K engaged with the drum B, while its brake mechanism O is disengaged from said drum, the operation of the parts is as follows: The shaft A, as indicated by the arrows, has a constant revolution in one direction, in this instance forward, and the disk being locked or held from rotation the sleeve E and disk D are likewise locked and held from rotation. The gear J constantly rotates with the shaft A, and the pinion I, being held at fixed points within the drum B, which is loose from its brake mechanism, motion is imparted to said drum to cause it to revolve in the direction indicated by the arrow in Fig. 2, which is a direction opposite to that of the rotation of the shaft A and at a much diminished speed—in fact, the minimum speed intended to be given to the sprocket-wheel G. The clutch K being locked to the drum B, the sleeve E and the sprocket-wheel G are likewise locked to the drum and partake of its direction and speed of rotation, and this imparts a backward rotation to the driven shaft and, we assume, a backward motion to the vehicle or automobile driven by said shaft and at its lowest rate of speed. Now assuming that it is desired to give the vehicle an opposite or forward direction of movement and at the same low rate of speed, it is only necessary to release the clutch K, brake mechanism N, and to throw into engagement the clutch L M and apply the brake mechanism O to the drum B. Under this adjustment the drum B is held from rotation and the pinion I is given a planetary rotation around the pinion J and necessarily around the shaft A, thereby putting the disk D under rotation, and with it the sleeve E, which having the clutch members L M locked to it and to the sleeve F and sprocket-wheel G imparts a relatively slow forward rotation to the sprocket-wheel G and a consequently slow forward movement to the vehicle, just the opposite of that described under the adjustment illustrated in Fig. 1. Now to impart a rapid or the same rate of speed to the sprocket-wheel G as that given the shaft A and in the same direction, or, in other words, to lock the sprocket-wheel G to the shaft A, all that is necessary is to throw off both the brakes and throw into engagement both the clutches, whereby, the disk D being locked to the sprocket-wheel through its sleeve and the medium of the clutches L M and the drum B being locked to the sprocket-wheel G through the medium of the clutch K, the disk D and drum B must necessarily be locked to each other, and consequently there can be no movement between the pinion I and internal gear H, and on account of the parts being so locked together they must necessarily revolve with the shaft A and at the same rate of speed, thereby imparting a fast forward motion to the sprocket-wheel G, and in consequence imparting a fast forward motion to the vehicle.

By the foregoing simple mechanism, which is not at all liable to breakage or disarrangement, I am enabled to obtain for the vehicle a slow forward and slow backward movement and a rapid forward movement.

In the remaining figures the construction is identical, except at the drum end of the apparatus.

Referring now to Figs. 3 and 4, the internal gear H in the drum is dispensed with, and the disk D', which corresponds to the disk D, before described, is itself a spur-gear P, meshing with a small pinion Q, forming part of a pair of cone-gears whose larger pinion R meshes with the gear J', fast on the shaft A. The cone-gears Q R are pivoted, as at $i$, in the heads $d$ C of the drum B. The manipulation and mode of operation of the parts are identical with that described for the construction of Figs. 1 and 2, except that the drum B instead of being locked to the gear J' through the medium of an internal gear is locked thereto through the medium of the cone-gears Q R and their pivots $i$, as will be readily understood.

In Figs. 5 and 6 the disk corresponding to the disk D of Figs. 1 and 2 is an internal bevel-gear $D^2$, with which mesh two or more beveled pinions S, journaled at an angle to blocks upon the interior of the head C and which mesh with a beveled gear $j^2$, fast upon the shaft A and corresponding to the gear J of Figs. 1 and 2. Under this construction the manipulation and mode of operation of the parts are identical with that described for the construction of Figs. 1 and 2 and 3 and 4.

While I have illustrated the driving-gear G as a sprocket-wheel, it is of course to be understood that the same may be a spur or any other kind of a gear or a belt-pulley for properly transmitting the driving motion to the driven shaft.

Having thus fully described my invention, I claim—

1. In transmitting mechanism of the character described, the combination of a shaft revolving in one direction, a clutch member loose upon said shaft, a disk provided with a sleeve likewise loose upon said shaft and adjacent to the foregoing clutch member, a gear fast upon said shaft, a gear intermediate of said disk and clutch member and engaging the last-named gear, a second clutch member fast upon the sleeve of said disk, a second sleeve loose upon the first-mentioned sleeve, a driving-gear carried by said second sleeve, independently-operated clutches feathered on said second sleeve for engagement and disengagement with said clutch members, mechanism for actuating said clutches, and brake mechanism for the said clutch members.

2. In transmitting mechanism of the character described, the combination of a shaft revolving in one direction, a drum-clutch loose upon said shaft and provided with an internal gear, a disk provided with a sleeve likewise loose upon said shaft and contained within the interior of the drum, a gear fast upon said shaft, a gear pivoted to said disk and meshing with the internal gear of the drum and engaging the gear fast upon the shaft, a clutch member fast upon the sleeve of said disk, a second sleeve loose upon the first-mentioned sleeve, a driving-gear carried by said second sleeve, independently-operated clutches feathered on said sleeve for engagement and disengagement with said drum-clutch and clutch member respectively, mechanism for actuating said clutches, and brake mechanism for said drum-clutch and clutch member, substantially as described.

HARRY W. SUMNER.

Witnesses:
EDWARD PECK,
GUS. G. HAMPSON.